Dec. 12, 1961  F. G. WAGNER  3,012,740
AIRCRAFT BOUNDARY LAYER CONTROL SYSTEM
Filed April 4, 1958  4 Sheets-Sheet 1

INVENTOR.
FRIEDRICH GEORG WAGNER
BY
his ATTORNEYS.

Dec. 12, 1961     F. G. WAGNER     3,012,740
AIRCRAFT BOUNDARY LAYER CONTROL SYSTEM
Filed April 4, 1958     4 Sheets-Sheet 2

INVENTOR.
FRIEDRICH GEORG WAGNER
BY
his ATTORNEYS.

FIG. 6.

United States Patent Office 3,012,740
Patented Dec. 12, 1961

3,012,740
AIRCRAFT BOUNDARY LAYER CONTROL SYSTEM
Friedrich Georg Wagner, San Diego, Calif., assignor to Fairchild Stratos Corporation, a corporation of Maryland
Filed Apr. 4, 1958, Ser. No. 726,365
19 Claims. (Cl. 244—42)

The present invention relates to boundary layer control systems and apparatus, and, more particularly, to novel and improved systems and apparatus applicable to all types of aircraft using boundary layer control to provide lift increment and drag reduction.

Boundary layer control systems employing suction and blowing arrangements for lift increment and/or drag reduction are well known and widely used. It has been demonstrated that the application of suction and blowing for boundary layer control results in very substantial improvements in aircraft performance. One type of known boundary layer control system employs a blower for exhausting air from the upper trailing wing surfaces through span-wise openings and suitable connections and delivering the exhausted air through other suitable connections and span-wise openings. These span-wise openings are usually spaced apart in aligned relation at different distances from the fuselage of the aircraft and are arranged in front of flaps over which at least the discharged air is directed. Known systems of this type often use complicated ducting arrangements inherently having high internal losses, and the internal air transport through the ducting arrangements consumes considerable pumping power.

It is customary in boundary layer control systems of this type to employ a single ducting arrangement in each wing half having one span-wise suction slot or set of adjacent slots leading to a driving unit such as a blower or other pumping mechanism and one span-wise blowing slot or set of adjacent blowing slots displaced longitudinally in a span-wise direction from the suction slot or slots along a substantial part of the trailing portion of each wing. The suction slot or slots may be inboard and the blowing slot or slots outboard of the driving unit, for example. Upon failure of the driving unit of such a single duct arrangement, the aircraft would be placed in a state of substantial imbalance, at least when the boundary layer control arrangements for the other wing half or other control surfaces are operative. In a single duct arrangements of this type, in order to provide a more or less proper air distribution, it is necessary to have the ducts occupy a large volume of the internal structure of the wing in both a span-wise and in a chord-wise direction, thus tending to reduce the structural stability of the wing or other control surface.

It has been found that as aircraft become faster, the wings become thinner and less space is available for internal structure, on the other hand the need for boundary layer control substantially increases. The high volume flow of air needed for efficient boundary layer control in a given aircraft wing requires a certain minimum size conduit to carry the needed amount of air. However a conduit of the required dimensions will usually not fit within the thin wing of the modern aircraft. Further, in view of the size restrictions and other operating conditions of a boundary layer control system, it is highly desirable to have the most efficient power system for driving the suction-blowing arrangement. It is also essential that this power system be designed to utilize the common fuel aboard the aircraft and that the fuel consumption be as low as possible. Also, because of the load requirements of an aircraft, it is important that dead load or load on the auxiliary power supply systems be reduced to a minimum.

In accordance with the invention, the above disadvantages are overcome with full consideration being given to the fuel consumption and load requirements of the aircraft in which the boundary layer systems and apparatus are to be used. More particularly, a multiple ducting system having a plurality of driving means, such as blowers, jet pumps, etc., are used in each wing half or other control assemblies such as the tailgroup. Further, a novel and improved pumping system is provided for producing a high pressure propellant for the driving mechanism of the boundary layer control arrangement, which may be a specially developed jet pump having no moving parts.

For a better understanding of the invention, reference may be had to the following detailed description taken in conjunction with the accompanying figures of the drawing, in which.

Figures 1, 2:
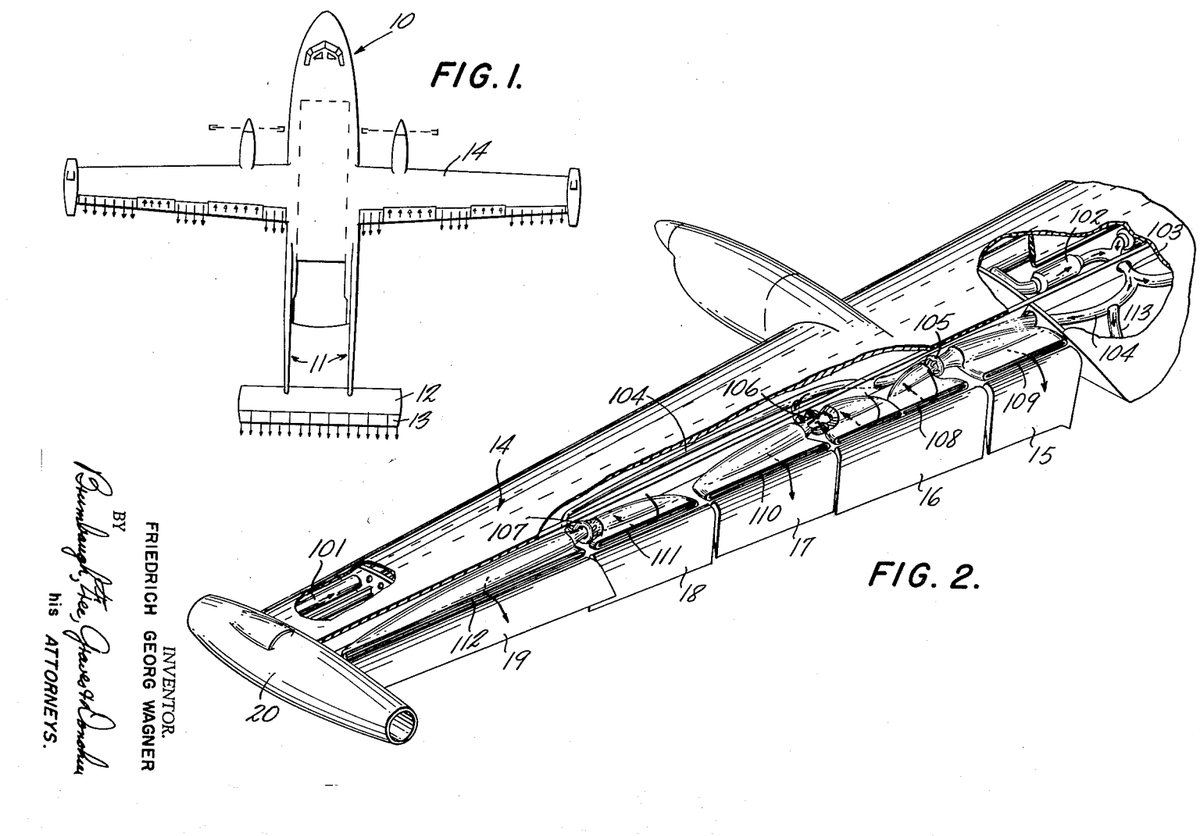
FIGURE 1 is the top view of an exemplary embodiment of an aircraft utilizing the pumping system and multiple ducting arrangement, in accordance with the invention.
FIG. 2 is a more detailed perspective view, partially broken away, of one wing half of the aircraft of FIG. 1, showing the manner in which the pumping system and the multiple duct suction and blowing arrangements of the invention operate.

In FIG. 1, a boundary layer control system in accordance with the invention is incorporated in a two-engine single-wing aircraft 10 having an empennage including a twin tail boom 11, a horizontal stabilizer 12 and an elevator 13. Each half of the wing 14 (as shown more clearly in FIG. 2) includes along its trailing edge, reading from inboard to outboard, a blowing flap 15, a suction flap 16, a blowing flap 17, a suction flap 18, a blowing aileron 19 and a turbo-compressor 20, the details of which will be explained hereinafter in relation to FIGS. 3 and 4.

Figure 5:
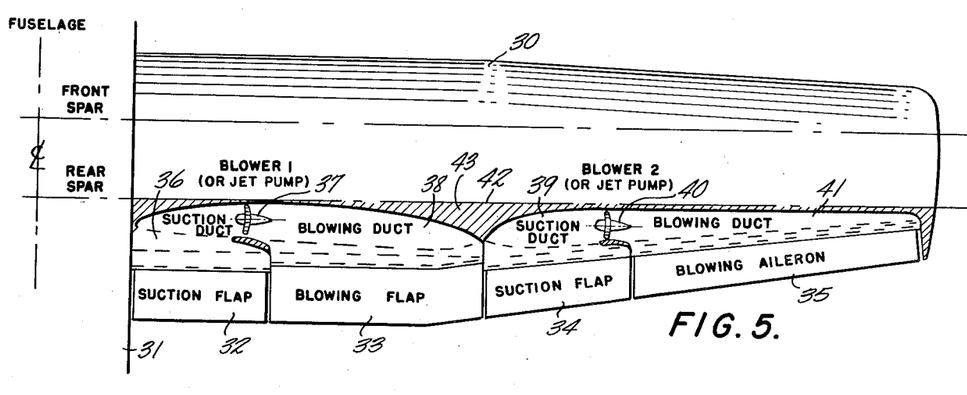
FIG. 5 is a schematic representation of one exemplary embodiment of a specific multiple ducting system in partially broken away section of a wing half, in accordance with the invention.
Figure 7:
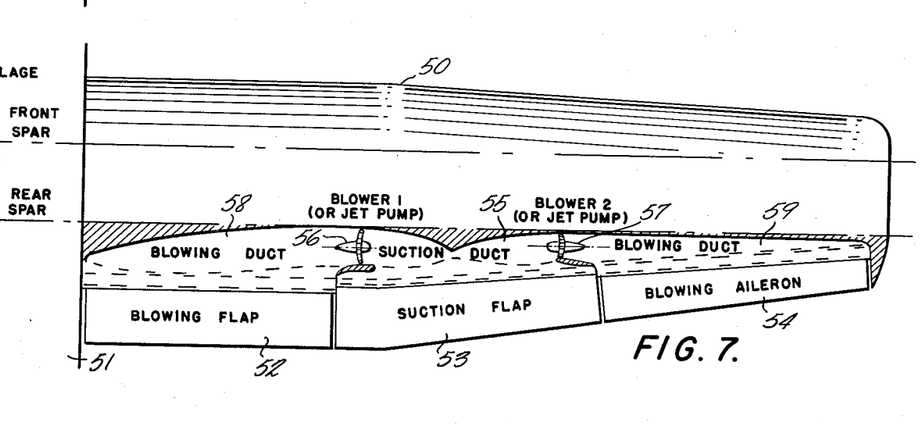
FIG. 7 is a schematic representation of an alternate exemplary embodiment of multiple ducting arrangement, in accordance with the invention.

The boundary layer control provided for the aircraft 10 involves a composite of two types of multiple ducting systems, as shown separately in simpler form in FIGS. 5 and 7. In FIG. 5, a wing half 30 has on its trailing edge, reading outboard from a fuselage 31, a suction flap 32, a blowing flap 33, a suction flap 34 and a blowing aileron 35. A suction duct 36 opens onto the suction flap 32 and is so constructed as to receive a flow of boundary air from the wing surface and direct it to the input of a driving means 37, which may be a conventional blower or a jet pump, for example. The driving means 37 then directs a stream of air span-wise into a blowing duct 38. The blowing duct 38 has a configuration such as to cause the span-wise stream of air from the driving means 37 to be exhausted in a chord-wise direction across the blowing flap 33. A second similar suction-blowing arrangement including the suction flap 34, a suction duct 39, a driving means 40, a blowing duct 41 and the blowing aileron 35 is positioned outboard of the first mentioned suction-blowing arrangement in a span-wise direction. The twin duct systems function, when the driving means 37 and 40 are operated, to provide a boundary layer control along the span-wise trailing edge of the wing-half 30.

In conventional boundary layer control systems of the prior art, such as aforementioned, the suction and blowing ducts would have an outline such as indicated by the dotted line 42 and would occupy that portion of the interior of the wing 30 indicated by the shaded portion 43 in addition to that portion of the wing half 30 occupied by the suction duct 36, the blowing duct 38, the suction duct 39, and the blowing duct 41. Because of this saving of space in the interior of the wing and the separate status of the two duct systems, a complete rib can be set chord-wise across the wing-half in the position indicated by the arrow A.

Since power losses in a duct system depend on the shape and dimensions of the ducts and the additional throttling devices for correcting the air distributions, the total pressure loss in a duct system such as shown in FIG. 5, for combined suction-blowing, can be computed by means of the following equation:

$$\Delta P_{total} = q_0(C_P \text{ static} + n_s C_{Q_s}^2 + n_B C_{Q_B}^2) \text{ lbs./ft.}^2 \quad (1)$$

in which $q_0$ is the flight dynamic pressure in lbs./ft.$^2$; $C_P$ static is the pressure loss coefficient due to static pressure difference at the suction and blowing slot (usually $C_P$ static is very small); $n_s$ is the pressure loss coefficient for the suction portion of the wing; $n_B$ is the pressure loss coefficient for the blowing portion of the wing; $C_{Q_s}$ is the suction quantity coefficient; and $C_{Q_B}$ is the blowing quantity coefficient. It has been found that in a twin suction-blowing duct system, such as shown in FIG. 5, designed in accordance with the invention, the pressure losses, i.e., the $n$ coefficients, are considerably reduced. Since the smallest cross-section in the duct through which the whole suction quantity is transported remains nearly the same but the quantity itself is cut by 50%, the critical highest duct velocity is reduced to approximately 50%. The distance from the suction to the blowing slot in the duct systems is also reduced roughly 50%, thereby producing an additional reduction in friction losses. This decrease in dynamic pressure loss makes the duct systems of the invention useful for thin wings, since the aspect ratio can be considerably increased before the velocity in this type of duct system becomes too high.

Figure 6:
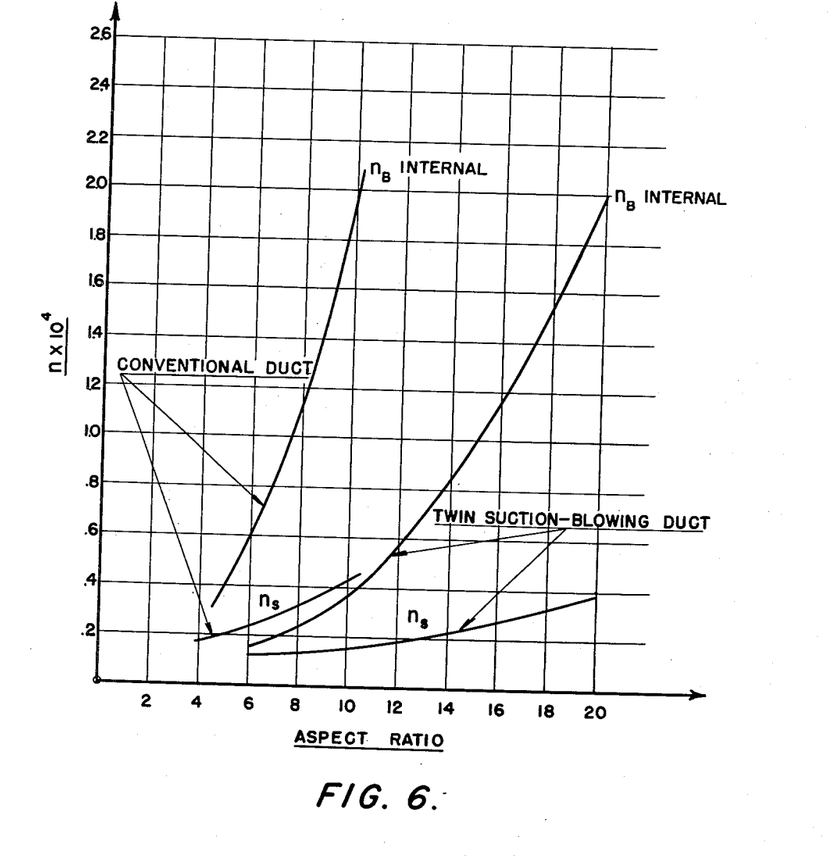
FIG. 6 is a graphical representation of the comparative characteristics of a conventional boundary layer control ducting system and a multiple ducting system, constructed in accordance with the invention, in which the relationship of the pressure loss coefficient to the aspect ratio is shown.

An indication of the magnitude of improvement achieved with twin suction-blowing ducts as compared to conventional single duct systems, having substantially the same suction and blowing slot areas, is apparent through a comparison of the pressure loss coefficients of the two systems shown graphically in FIG. 6.

Each of the twin duct systems of FIG. 5 operates by drawing air into the wing 30 through one or several suction slots or porous surfaces (not shown), carrying the air in chord-wise direction into the suction ducts 36 or 39, and discharging it span-wise into the blowing ducts 38 or 41. The cross-section of the suction duct is expanded in the outboard direction at a rate which is proportional to the volume of additional air so that a substantially constant duct velocity is attained. The air is then transported span-wise by the driving means 37 or 40 located between the suction and blowing ducts 36 and 38, or 39 and 41, respectively. As the air continues into the outboard portion of the blowing duct 38 or 41, it is finally traveling chord-wise and is ejected through one or several blowing slots across either the blowing flap 33 or the blowing aileron 35, respectively. The cross-sectional area of the blowing duct is diminished in the outboard direction at a rate which is proportional to the rate of air removal so that there is a substantially constant span-wise velocity maintained in the blowing duct.

Thus there is provided a novel and improved boundary layer control system and apparatus having highly reduced internal losses, as shown in FIG. 6, and in which the desired distribution of the suction and blowing air is easier to control because of the shorter length of the combined suction and blowing ducts, thereby reducing throttle losses. The twin duct systems can be designed to transport different quantities of air in accordance with the lift distribution and may be finally adjusted to obtain the best air distribution. This results in a gain in lift or a reduction of the pumping or driving power needed to produce the same lift.

The use of four flaps, the two suction flaps 32 and 34, the blowing flaps 33 and the blowing aileron 35, in contrast to the conventional three flaps in prior art boundary layer control systems, which normally include a suction flap, a blowing flap and a blowing aileron, enables the flaps to be set more closely to the best different deflection angles to provide a desired twist. It is also important to note that the use of four driving units, two in each wing half, for the boundary layer control system provides a multi-engine safety factor against failure, which is a decided advantage over conventional systems having one driving unit in each wing half. Twin duct systems such as shown in FIG. 5 are easier to fabricate than single conventional large size duct systems, and the twin duct systems may be so constructed as to have greater resistance to pressure loadings than would be practical in conventional single duct systems.

In some circumstances, it may be desirable to effect a compromise between conventional single duct systems and multi-duct systems of the type shown in FIG. 5 for at least certain types of aircraft. As shown in FIG. 7, a half wing 50 extending in a span-wise direction from a fuselage 51 includes in its trailing edge, reading in an outboard direction, a blowing flap 52, a suction flap 53, and a blowing aileron 54. A suction duct 55 having two oppositely directed outputs sucks in air at least in part across the suction flap 53 and directs quantities of the air in a chord-wise direction toward driving means 56 and 57, which again may be conventional blowers or jet pumps, for example. The driving means 56 in turn drives a quantity of air in a span-wise direction inboard through a blowing duct 58 in which the air becomes directed in a chordwise fashion to be exhausted across the blowing flap 52. Similarly, the driving means 57 pushes a quantity of air in a span-wise direction outboard into a blowing duct 59 in which the air is turned in a chord-wise direction to be exhausted across the blowing aileron 54.

The cross-section of that portion of the suction duct 55 leading to the driving means 56 is expanded in an inboard direction at a rate which is proportional to the volume of additional air so that a nearly constant duct velocity is obtained, and the cross-sectional area of the blowing duct 58 is diminished in the inboard direction at a rate which is proportional to the rate of air removal in order to maintain a substantially constant span-wise velocity. Similarly, that portion of the suction duct 55 leading to the driving means 57 is expanded in the outboard direction at a rate which is proportional to the volume of additional air so that a nearly constant duct velocity is obtained, and the cross-sectional area of the blowing duct 59 is diminished in the outboard direction at a rate which is proportional to the rate of air removal so as to maintain a substantially constant span-wise velocity. The suction quantity traveling through the areas of smallest cross-section at the driving means 56 and 57 is again only half the quantity that would be required in a conventional single duct system.

As is the case in the twin duct system of FIG. 5, a system of the type shown in FIG. 7 provides a substantial reduction in total pressure loss. It has been found that the distribution and pressure losses in the suction portion of the wing 50 are slightly better than those in the twin duct systems in the wing 30 of FIG. 5, even though the main distances from the suction slot to the blowing slot are somewhat in between corresponding distances in conventional single duct systems and in the twin duct systems of FIG. 5. While the total pressure losses which can be expected in systems of the type shown in FIG. 7 are slightly higher than the twin duct system of FIG. 5, they are substantially less than what would be encountered in a conventional duct system. Also, the advantage of the multi-engine safety factor is maintained in the multi-duct system of FIG. 7.

Figures 3, 4:
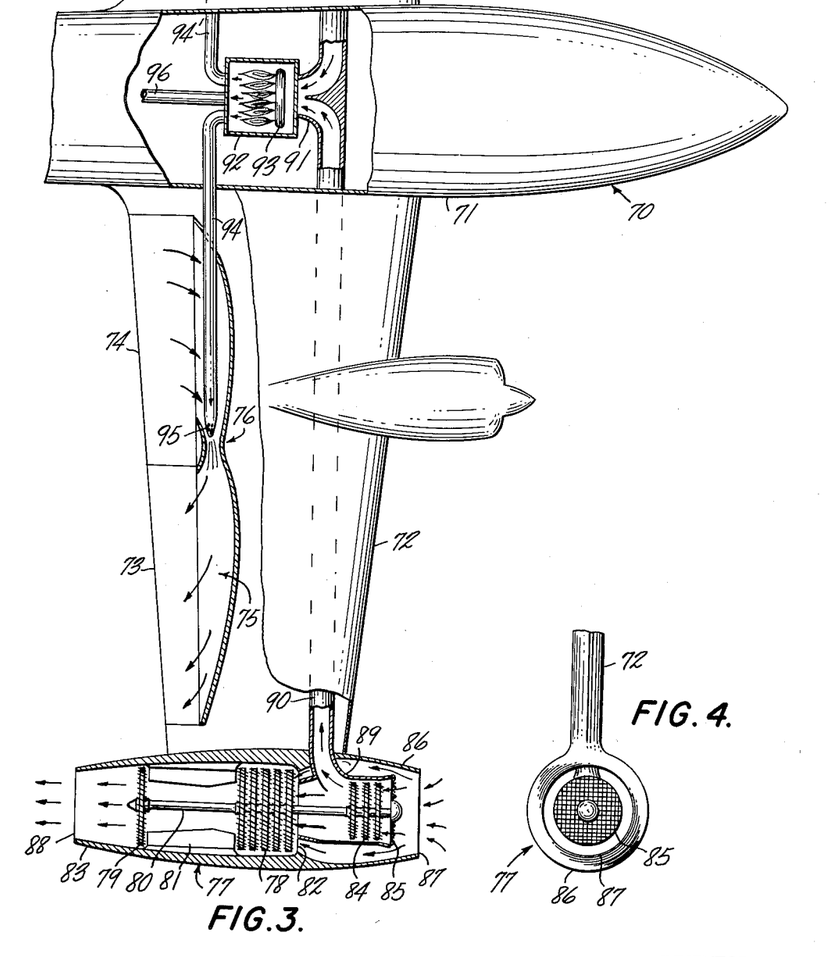
FIG. 3 is a schematic diagram showing details of the exemplary embodiment of the power system for the boundary layer control arrangement, in accordance with the invention.
FIG. 4 is a front end view of a wing tip compound power plant disclosed in FIG. 3.

The exemplary embodiment of a novel and improved pumping system for producing a high presure propellant for the driving mechanism of the boundary layer control system shown in detail in FIGS. 3 and 4, for simplicity of description, is disclosed in conjunction with a conventional single duct boundary layer control arrangement. However, as will be described hereinafter, it is also intended to be used with multi-duct boundary layer control systems, as shown in FIG. 2, for example. For the practical operation of jet pumps in an aircraft, due to space and weight limitations, propellants of the highest possible pressure and the highest specific energy are most suitable. In the disclosed embodiment, air is used as the basic propellant, although it will be evident that other gases and steam could be advantageously used.

In FIG. 3, an aircraft 70 has a central fuselage 71 and a wing 72, including a conventional aileron 73 and flaps 74. The aileron 73 and the flaps 74 are provided with a single duct boundary layer control system 75 which is powered by a jet pump 76.

A compound power plant 77 is provided at each tip of the wing 72. The power plant 77 may comprise a somewhat conventional turbojet engine having a conventional compressor 78 driven by a turbine 79 through a shaft 80. Conventional combustors 81 are provided between the compressor 78 and the turbine 79. The jet engine is also provided with a suitable air intake 82 and a tail pipe 83.

A second compressor 84 of conventional design is positioned in front of the first compressor 78 and is driven by the turbine 79 through the shaft 80 in rotation with the compressor 78. The second compressor 84 is provided with a suitable air intake 85 and the entire combination of the first and second compressors 78 and 84, the turbine 79 and the combustors 81 is enclosed within a cylindrical casing 86 having a circular air intake opening 87 at the forward end and a circular air outlet 88 at its rearward end.

A compressed air bleed 89 is provided just rearward of the forward compressor 84, and functions to bleed a substantial amount of the relatively cold compressed air from the output of the forward compressor 84 and pass it into a wing conduit 90, which extends completely through the fuselage 71 and through the wing half on the opposite side thereof to a similar compressor on the opposite wing tip. The air duct 90 is intersected at or near its midpoint in the fuselage 71 by a duct 91 leading from the duct 90 to a combustion chamber 92 containing burners 93, which may take any suitable conventional form. The burners 93 act to heat the relatively cold compressed air bled from the output of the compressor 84. The heated compressed air is then passed through relatively hot compressed air ducts 94 and 94' to a conventional jet nozzle 95 of each of the jet pumps 76, which are located in each of the suction-blowing boundary layer duct arrangements in the wing halfs and in any other desired location on the aircraft.

In operation, the turbojet engines of each of the power plants 77 at each wing-tip are started when boundary layer control is desired. After the wing-tip jets have been started, the burners 93 in the combustion chamber 92 are ignited. Air enters the main circular air intake opening 87 and part of this air enters the air intake 85 of the forward compressor 84 while the other part enters the air intake 82 for the compressor 78. The compressor 78 compresses the air and heat is added by the combustors 78 so that the resultant heated high velocity gas drives the turbine 79 and passes out as a jet through the circular air outlet 83. After the forward compressor 84 compresses the air entering the air intake 85, part of the compressed air output is bled into the duct 90 and in turn into the duct 91 leading to the combustion chamber 92, while the other part passes on into the air intake 82 leading to the compressor 78.

In the combustion chamber 92, the relatively cold compressed air is heated to a high temperature and passed through the hot air ducts 94 and 94' to the respective jet nozzles 95. The high energy gas issuing from the jet nozzles 95 sucks outside boundary air from the wing surface and across the flap 74, through the suction duct portion of the duct system 75, and through the jet pump 76 to the blowing duct portion of the duct system 75 and suitable duct openings and thence outwardly toward the aileron 73. For certain types of boundary layer control, the jet pump 76 may be arranged to cause the air flow in a reverse direction, in across the aileron 73 and out over the flap 74.

In addition, other ducts, such as duct 96 may be used to lead a part of the high energy gas in the output of the combustion chamber 92 to the empennage or other portions of the aircraft to provide a control air flow, such as indicated by the arrows across the elevator 13 of the aircraft 10 in FIG. 1.

The operation of the pumping system of FIGS. 3 and 4 in conjunction with a composite multiple duct boundary layer control system embodying the features of the systems disclosed in FIGS. 5 and 7 is clearly shown in FIG. 2, in which the turbo-compressor 20 is constructed and functions in a manner similar to the power plant 77 of FIGS. 3 and 4 to feed compressed air through a duct 101 in the wing 14 leading to a combustion chamber 102. The compressed air is heated in the combustion chamber 102 to provide a high energy gas output into a duct system 103. One branch 104 of the duct system 103 feeds the high energy gas to the jet nozzles of the jet pumps 105, 106 and 107.

The jet pump 105 sucks in air from the wing surface and over the suction flap 15 through a portion of the suction slot 108 and blows it out through a blowing slot 109 across the blowing flap 15. The jet pump 106 sucks in air across the suction flap 16 through another portion of the suction slot 108 and blows it out through a blowing slot 110 across the blowing flap 17. Similarly the jet pump 107 sucks in air across the suction flap 18 through a suction slot 111 and blows it out through a blowing slot 112 across the blowing aileron 19. Another branch 113 of the duct system 103 may be connected to lead the high energy gas to the empennage where it may be blown across the elevator control surface.

Thus there has been provided in accordance with the invention novel and improved boundary layer control systems and apparatus including a novel and improved pumping system and a multiple duct suction-blowing arrangement utilizing a plurality of driving or pumping means in each wing resulting in very substantial reductions in the internal losses of the control system thereby providing greater increase in lift and/or reduction in drag than that available in conventional systems.

It will be evident to those skilled in the art that the above disclosed embodiments are meant to be merely exemplary and that they are susceptible of modification and variation without departing from the spirit and scope of the invention. For example, while wing-tip power plants are used in the disclosed exemplary embodiments, the power plant for providing the high pressure propellant may be located in any available space in the aircraft, since the losses of the high pressure propellant in the case of long conduits or ducts would not be exorbitant. On the other hand, wing-tip installations at present appear to be most suitable because the distance from the fuselage represents a safety feature in the case of failure or crash landings. Also a wing-tip installation can increase the effective aspect ratio. Further, the exhaust products, usually in the form of jets, of the power plant can most easily be guided by utilizing thrust and special jet effects when the power plant is positioned at the wing tip. Also, it will be apparent that the direction and quantity of air flow through the boundary layer control system may, in accordance with the invention, be adapted to fit the particular type and function of the aircraft in which the boundary layer control is to be used.

It will be apparent that the principles of the invention are equally applicable to groups of three or more boundary layer control duct systems. This may be especially true in the case of aircraft having very thin wings or wings of very high aspect ratio. Therefore, it is deemed that the invention is not limited except as defined by the appended claims.

I claim:
1. A boundary layer control system for an aircraft having at least one wing extending laterally from the fuselage thereof, comprising a plurality of duct systems in the wings spaced at different outboard distances from the aircraft fuselage, each of said duct systems including a suction portion for sucking boundary layer air from a zone adjacent the surface of said wing, a blowing portion for blowing air over a zone adjacent a surface of said wing, and driving means for developing suction in said suction portion and propelling air from said suction portion through said blowing portion, a source of compressed gas, means for heating said compressed gas, and means for operating each of said driving means by said heated compressed gas.

2. A boundary layer control system for an aircraft having at least one wing extending laterally from the fuselage thereof, comprising a plurality of duct systems in the wing spaced at different outboard distances from the aircraft fuselage, each of said duct systems including a suction portion for sucking boundary layer air from a zone adjacent the surface of said wing, a blowing portion for blowing air over a zone adjacent a surface of said wing, and driving means for developing suction in said suction portion and propelling air from said suction portion through said blowing portion, a source of compressed air including a turbo-compressor mounted on said aircraft, means for heating said compressed air from said source and means for operating each of said driving means by said heated compressed air.

3. A boundary layer control system for an aircraft having at least one wing extending laterally from the fuselage thereof, comprising a plurality of duct systems in the wing spaced at different outboard distances from the aircraft fuselage, each of said duct systems including a suction portion for sucking boundary layer air from a zone adjacent the surface of said wing, a blowing portion for blowing air over a zone adjacent a surface of said wing, and driving means for developing suction in said suction portion and propelling air from said suction portion through said blowing portion, a turbo-compressor mounted on the outboard end of said wing and having an output providing a source of compressed air, means for heating said compressed air, and means for operating each of said driving means by said heated compressed air.

4. A boundary layer control system for an aircraft having at least one wind extending laterally on opposite sides of the fuselage thereof, comprising a plurality of duct systems in each laterally extending wing portion spaced at different outboard distances from the aircraft fuselage, each of said duct systems including a suction portion for sucking boundary layer air from a zone adjacent the surface of said wing, a blowing portion for blowing air over a zone adjacent a surface of said wing, and driving means for developing suction in said suction portion and propelling air from said suction portion through said blowing portion, turbo-compressor means mounted on said aircraft for supplying compressed air, means for heating the compressed air, and means for operating each of said driving means by said heated compressed air.

5. A boundary layer control system for an aircraft having at least one wing extending laterally on opposite sides of the fuselage thereof, comprising a plurality of duct systems in each of the laterally extending portions of the wing spaced at different outboard distances from the aircraft fuselage, each of said duct systems including a suction portion for sucking boundary layer air from a zone adjacent a surface of said wing, a blowing portion for blowing air over a zone adjacent a surface of said wing, and driving means for developing suction in said suction portion and propelling air from said suction portion through said blowing portion, a turbo-compressor means mounted on each of said laterally extending portions of said wings outboard from said fuselage for supplying compressed air, means for heating said compressed air, and means for operating each of said driving means by said heated compressed air.

6. A boundary layer control system for an aircraft having at least one wing extending laterally on opposite sides of the fuselage thereof, comprising a plurality of duct systems in each laterally extending portion of the wing spaced at different outboard distances from the aircraft fuselage, each of said duct systems including a suction portion for sucking boundary layer air from a zone adjacent a surface of said wing, a blowing portion for blowing air over a zone adjacent a surface of said wing, and driving means for developing suction in said suction portion and propelling air from said suction portion through said blowing portion, turbo-compressor means mounted on the outboard ends of each of said laterally extending wing portions for supplying compressed air, means for heating said compressed air, and means for operating each of said driving means by said heated compressed air.

7. A boundary layer control system for an aircraft having at least one wing extending laterally on opposite sides of the fuselage thereof, comprising a plurality of duct systems in each laterally extending portion of the wing spaced at different outboard distances from the aircraft fuselage, each of said duct systems including a suction portion for sucking boundary layer air from a zone adjacent a surface of said wing, a blowing portion for blowing air over a zone adjacent a surface of said wing, and jet pump means for developing suction in said suction portion and propelling air from said suction portion through said blowing portion, a source of compressed air, means for heating said compressed air, and means for operating each of said jet pump means by said heated compressed air.

8. A boundary layer control system for an aircraft having at least one wing extending laterally on opposite sides of the fuselage thereof, comprising a plurality of duct systems in each of said laterally extending portions of the wing spaced at different outboard distances from the aircraft fuselage, each of said duct systems including a suction portion for sucking boundary layer air from a zone adjacent a surface of said wing, a blowing portion for blowing air over a zone adjacent a surface of said wing, and jet pump means for developing suction in said suction portion and propelling air from said suction portion through said blowing portion, turbo-compressor means mounted on said aircraft for supplying compressed air, means for heating said compressed air, and means for operating each of said jet pump means by said heated compressed air.

9. A boundary layer control system for an aircraft having at least one wing extending laterally on opposite sides of the fuselage thereof, comprising a plurality of duct systems in each of the laterally extending portions of the wing spaced at different outboard distances from the aircraft fuselage, each of said duct systems including a suction portion for sucking boundary layer air from a zone adjacent a surface of said wing, a blowing portion for blowing air over a zone adjacent a surface of said wing, and jet pump means for developing suction in said suction portion and propelling air from said suction portion through said blowing portion, turbo-compressor means mounted on each of said laterally extending wing portions for supplying compressed air, means for heating said compressed air, and means for operating each of said jet pump means by said heated compressed air.

10. A boundary layer control system for an aircraft having at least one wing extending laterally on opposite sides of the fuselage thereof, comprising a plurality of duct systems in each of the laterally extending portions of the wing spaced at different outboard distances from the aircraft fuselage, each of said duct systems including a suction portion for sucking boundary layer air from a zone adjacent the surface of said wing, a blowing portion for blowing air over a zone adjacent a surface of said wing, and jet pump means for developing suction in said suction portion and propelling air from said suction portion through said blowing portion, turbo-compressor means mounted on the outboard ends of each of said laterally extending wing portions for supplying compressed air, means for heating said compressed air, and means for operating each of said jet pump means by said heated compressed air.

11. A boundary layer control system as described in claim 10, including means for exhausting a portion of said heated compressed air over control surfaces of said aircraft.

12. A boundary layer control system for an aircraft having at least one wing extending laterally from the fuselage thereof, comprising a plurality of duct systems in the wing spaced at different outboard distances from the aircraft fuselage, a plurality of movable control surfaces in said wing spaced at different outboard distances from said aircraft fuselage, each of said duct systems including a suction portion for sucking boundary layer air from a zone adjacent a surface of said wing and a respective one of said plurality of movable control surfaces, a blowing portion for blowing air over a zone adjacent a surface of said wing including a different respective one of said plurality of movable control surfaces, and driving means for developing suction in said suction portion and propelling air from said suction portion through said blowing portion.

13. A boundary layer control system for an aircraft having at least one wing extending laterally from the fuselage thereof, comprising a plurality of duct systems in the wing spaced at different outboard distances from the aircraft fuselage, each of said duct systems including a suction portion having longitudinally extending span-wise suction slot means opening to the surface of said wing for sucking boundary layer air from a zone adjacent the surface of said wing, a blowing portion having longitudinally extending span-wise blowing slot means opening to a surface of the wing for blowing air over a zone adjacent a surface of said wing and driving means for developing suction in said suction portion and propelling air from said suction portion through said blowing portion, each of said suction slot means and said blowing slot means being positioned at different outboard distances from said fuselage.

14. A boundary layer control system for an aircraft having at least one wing extending laterally from the fuselage thereof, comprising a plurality of duct systems in the wings spaced at different outboard distances from the aircraft fuselage, each of said duct systems including a suction portion having longitudinally extending span-wise suction slot means opening to the surface of said wing for sucking boundary layer air from a zone adjacent a surface of said wing, a blowing portion having longitudinally extending span-wise blowing slot means opening to a surface of said wing for blowing air over a zone adjacent the surface of said wing, and driving means for developing suction in said suction portion and propelling air from said suction portion through said blowing portion, said suction slot means and said blowing slot means of each of said duct systems being relatively displaced at different outboard distances from said fuselage, and said suction slot means and said blowing slot means of one of said duct systems being positioned inboard of said suction slot means and said blowing slot means of another of said duct systems.

15. A boundary layer control system for an aircraft having at least one wing extending laterally from the fuselage thereof, comprising a plurality of duct systems in the wing spaced at different outboard distances from the aircraft fuselage, each of said duct systems including a suction portion having longitudinally extending span-wise suction slot means opening to a surface of said wing for sucking boundary layer air from a zone adjacent a surface of said wing, a blowing portion having longitudinally extending span-wise blowing slot means opening to a surface of said wing for blowing air over a zone adjacent a surface of said wing, and driving means for developing suction in said suction portion and propelling air from said suction portion through said blowing portion, said suction slot means and said blowing slot means of each of said duct systems being relatively displaced at different outboard distances from said fuselage, said suction slot means of two of said duct systems being adjacent one another with one being outboard of the other, said blowing slot means of the duct system including the inboard suction slot means being positioned inboard of its respective suction slot means, and said blowing slot means of the duct system including the outboard suction slot means being positioned outboard of its respective suction slot means.

16. A boundary layer control system for an aircraft having at least one wing extending laterally from the fuselage thereof, comprising a plurality of duct systems in the wings spaced at different outboard distances from the aircraft fuselage, a plurality of movable control surfaces in said wing spaced at different outboard distances from said aircraft fuselage, each of said duct systems including a suction portion having longitudinally extending span-wise suction slot means opening to a surface of said wing for sucking boundary layer air from a zone adjacent a surface of said wing, a blowing portion having longitudinally extending span-wise blowing slot means opening to a surface of said wing for blowing air over a zone adjacent a surface of said wing, and driving means for developing suction in said suction portion and propelling air from said suction portion through said blowing portion, said suction slot means and said blowing slot means of one of said duct systems opening toward respective ones of said plurality of movable control surfaces, said suction slot means and said blowing slot means of another of said duct systems opening toward respective ones of said plurality of movable control surfaces different from and outboard of the first mentioned ones of said plurality of movable control members.

17. A boundary layer control system for an aircraft having at least one wing extending laterally from the fuselage thereof, comprising a plurality of duct systems in the wing spaced at different outboard distances from the aircraft fuselage, a plurality of movable control surfaces spaced at respectively different outboard distances from the aircraft fuselage, each of said duct systems including a suction portion having longitudinally extending span-wise suction slot means opening to the surface of said wing for sucking boundary layer air from the zone adjacent a surface of said wing, a blowing portion having longitudinally extending span-wise blowing slot means opening to a surface of said wing for blowing air over a surface of said wing, and driving means for developing suction in said suction portion and propelling air from said suction portion through said blowing portion, the blowing slot means of one of said duct systems opening toward an inboard one of said plurality of movable control surfaces, the blowing slot means of another of said duct systems opening toward an outboard one of said plurality of movable control surfaces, and said suction slot means of said first and second duct systems opening toward a common one of said plurality of movable control surfaces intermediate said inboard movable control surface and said outboard movable control surface.

18. A boundary layer control system for an aircraft having at least one wing extending laterally from the fuselage thereof, comprising a plurality of duct systems in the wing spaced at different outboard distances from the aircraft fuselage, each of said duct systems including a suction portion for sucking boundary layer air from a zone adjacent the surface of said wing, a blowing portion for blowing air over a zone adjacent a surface of said wing and driving means for developing suction in said suction portion and propelling air from said suction portion through said blowing portion, said driving means including jet pump means controlled by a flow of heated compressed air, turbo-compressor means for supplying compressed air, means for heating said compressed air, and means for operating each of said jet pump means by said heated compressed air.

19. A boundary layer control system for an aircraft having at least one wing extending laterally from the fuselage thereof, comprising a plurality of duct systems in the wing spaced at different outboard distances from the aircraft fuselage, each of said duct systems including a suction portion for sucking boundary layer air from a zone adjacent the surface of said wing, a blowing portion for blowing air over a zone adjacent the surface of said wing, and driving means for developing suction in said suction portion and propelling air from said suction portion through said blowing portion, said driving means including jet pump means controlled by a flow of hot compressed air, turbo-compressor means including a turbine, a shaft driven by said turbine, a main compressor for supplying compressed air to said turbine, an auxiliary compressor having a compressed air output, said main compressor and said auxiliary compressor being axially mounted on said shaft in longitudinally spaced arrangement, heating means, and duct means for feeding at least a portion of the compressed air output of said auxiliary compressor through said heating means to operate said jet pump means.

References Cited in the file of this patent

UNITED STATES PATENTS

| | | |
|---|---|---|
| 2,270,920 | Backhaus | Jan. 27, 1942 |
| 2,464,369 | Baxter | Mar. 15, 1949 |
| 2,584,961 | Beck | Feb. 5, 1952 |
| 2,585,676 | Poisson-Quinton | Feb. 12, 1952 |
| 2,620,967 | Worn | Dec. 9, 1952 |
| 2,650,666 | Dorand | Sept. 1, 1953 |
| 2,890,843 | Attinello | June 16, 1959 |
| 2,912,189 | Pouit | Nov. 10, 1959 |

FOREIGN PATENTS

| | | |
|---|---|---|
| 768,072 | Germany | June 10, 1955 |

UNITED STATES PATENT OFFICE

CERTIFICATION OF CORRECTION

Patent No. 3,012,740                          December 12, 1961

Friedrich Georg Wagner

It is hereby certified that error appears in the above numbered patent requiring correction and that the said Letters Patent should read as corrected below.

Column 1, line 48, strike out "a"; column 2, line 1, for "on" read -- of --; column 7, line 68, for "wind" read -- wing --.

Signed and sealed this 24th day of April 1962.

(SEAL)
Attest:

ESTON G. JOHNSON                                  DAVID L. LADD
Attesting Officer                                      Commissioner of Patents